(12) United States Patent
Kameda et al.

(10) Patent No.: US 11,231,380 B2
(45) Date of Patent: Jan. 25, 2022

(54) FLUID-PROPERTY DETECTION DEVICE

(71) Applicant: KYB Corporation, Tokyo (JP)

(72) Inventors: Yukinori Kameda, Kanagawa (JP); Takahiro Yoshida, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 75 days.

(21) Appl. No.: 16/639,443

(22) PCT Filed: May 14, 2018

(86) PCT No.: PCT/JP2018/018608
§ 371 (c)(1),
(2) Date: Feb. 14, 2020

(87) PCT Pub. No.: WO2019/049429
PCT Pub. Date: Mar. 14, 2019

(65) Prior Publication Data
US 2021/0033554 A1 Feb. 4, 2021

(30) Foreign Application Priority Data

Sep. 11, 2017 (JP) .............................. JP2017-174361

(51) Int. Cl.
*G01N 27/07* (2006.01)
*G01N 27/22* (2006.01)

(52) U.S. Cl.
CPC ........... *G01N 27/07* (2013.01); *G01N 27/221* (2013.01)

(58) Field of Classification Search
CPC ..... G01N 27/07; G01N 27/221; G01N 27/226
USPC ........................................................ 324/439
See application file for complete search history.

(56) References Cited

U.S. PATENT DOCUMENTS

| 6,297,733 | B1 | 10/2001 | Park |
| 2004/0036487 | A1 | 2/2004 | Heremans et al. |
| 2015/0346137 | A1* | 12/2015 | Kato .................... G01N 27/403 204/412 |

FOREIGN PATENT DOCUMENTS

| EP | 3683574 A1 | 7/2020 |
| JP | 2009-025185 A | 2/2009 |
| JP | 2013195160 A | 9/2013 |
| JP | 2014-142204 A | 8/2014 |

* cited by examiner

*Primary Examiner* — Farhana A Hoque
(74) *Attorney, Agent, or Firm* — Rabin & Berdo, P.C.

(57) ABSTRACT

A fluid-property detection device includes a housing attached to the external device, the housing being configured to hold the outer electrode and the inner electrode, an outer insulating member provided between the housing and the outer electrode, the outer insulating member being configured to insulate between the housing and the outer electrode, and an inner insulating member provided between the outer electrode and the inner electrode, the inner insulating member being configured to insulate between the outer electrode and the inner electrode, being configured to insulate between the housing and the inner electrode. The outer electrode and the inner electrode respectively have tip end portions, the tip end portions projecting out from the housing and being configured to expose to the detection target fluid contained in the external device.

7 Claims, 4 Drawing Sheets

FLUID-PROPERTY DETECTION DEVICE

TECHNICAL FIELD

The present invention relates to a fluid-property detection device.

BACKGROUND ART

JP2009-25185A discloses an electric conductivity meter for measuring electric conductivity of a liquid that is provided with a pipe-shaped outer electrode and a bar-shaped inner electrode. In the electric conductivity meter, the outer electrode formed of a conductive metal is screw connected to an electrode seat formed of a conductive metal, and the electrode seat is screw connected to a container that contains the liquid as the measurement target.

SUMMARY OF INVENTION

With the meter disclosed in JP2009-25185A, because the container containing the liquid is electrically connected to the outer electrode via the electrode seat, there is a risk in that, when there is external noise on the container, measurement accuracy of the meter is deteriorated by the influence of the noise.

For example, in a processing device that performs a predetermined processing by driving a hydraulic pump with an electric motor and supplying working oil discharged from the hydraulic pump to an actuator, the electric conductivity of the working oil is measured by using the meter described in JP2009-25185A. The meter is screw connected to a predetermined part of the container containing the working oil in the processing device such that the outer electrode and the inner electrode of the meter are exposed to the working oil. The meter detects voltage value that is correlated to current between the electrodes and computes the electric conductivity on the basis of the detection result. In such a case, the voltage value to be detected by the meter is very small compared with the voltage value of the commercial power supply for supplying the electrical power to the electric motor of the processing device. Therefore, when the noise from the commercial power supply enters the meter via the processing device, the voltage value to be detected by the meter is largely influenced by the noise.

An object of the present invention is to improve detection accuracy of a fluid-property detection device.

According to one aspect of the present invention, a fluid-property detection device for detecting a property of a detection target fluid contained in an external device includes: a tubular outer electrode; a bar-shaped inner electrode provided inside the outer electrode; a computing unit configured to compute a property value of the detection target fluid based on an electrical property between the outer electrode and the inner electrode; a housing attached to the external device, the housing being configured to hold the outer electrode and the inner electrode; an outer insulating member provided between the housing and the outer electrode, the outer insulating member being configured to insulate between the housing and the outer electrode and being configured to define a position of the outer electrode with respect to the housing; and an inner insulating member provided between the outer electrode and the inner electrode, the inner insulating member being configured to insulate between the outer electrode and the inner electrode, being configured to insulate between the housing and the inner electrode, and being configured to define a position of the inner electrode with respect to the housing. The outer electrode and the inner electrode respectively have tip end portions, the tip end portions projecting out from the housing and being configured to expose to the detection target fluid contained in the external device.

DESCRIPTION OF EMBODIMENTS

A fluid-property detection device according to an embodiment of the present invention will be described below with reference to the drawings.

The fluid-property detection device detects a property of working oil serving as working fluid contained in an external processing device (an external device) provided with a hydraulic actuator such as a hydraulic cylinder, etc., for example. The hydraulic actuator is driven by the working oil that is supplied from a hydraulic pump driven by an electric motor. As the hydraulic actuator is driven, a predetermined processing such as pressing, cutting, and so forth is performed. The fluid-property detection device is attached to a predetermined part of a container (in other words, a piping, a tank, and so forth) containing the working oil used in the external processing device. It should be noted that a detection target of the fluid-property detection device is not limited to the working oil, and may be various kinds of liquid and gas such as lubricating oil, cutting oil, fuel, solvent, chemical agent, and so forth. In the following, a description will be given of a case in which the fluid-property detection device is an oil-property detection device 100 that detects the properties of the working oil in a piping 1 as the detection target fluid.

Figure 1:
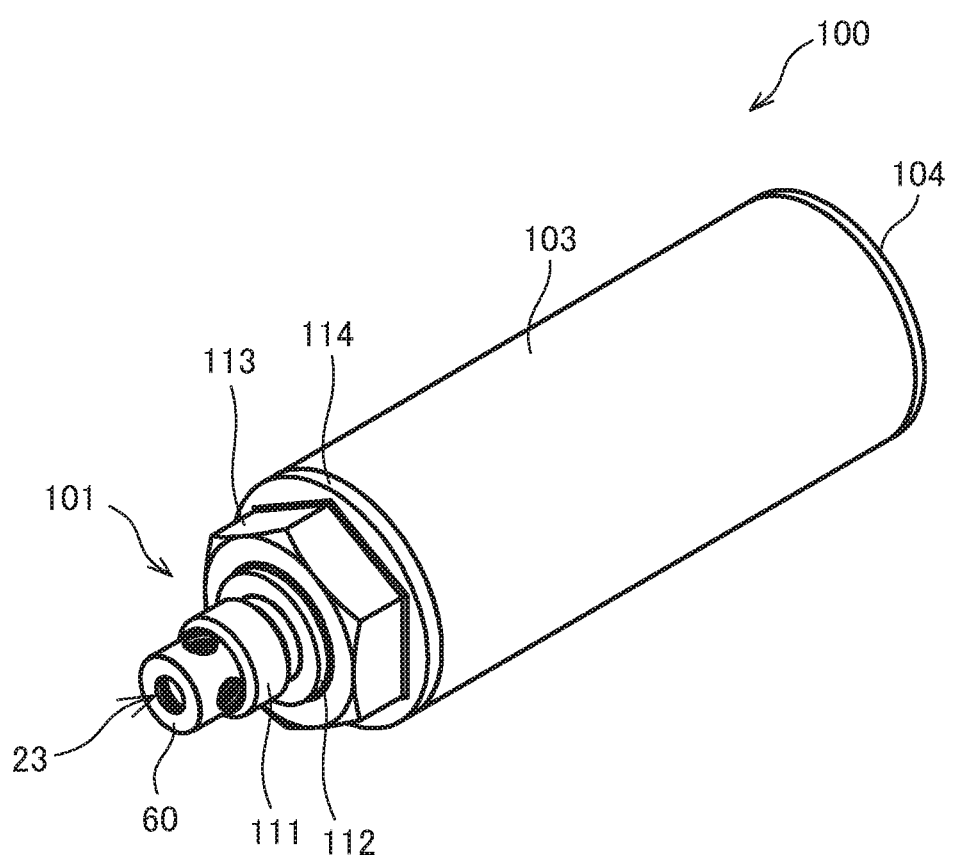
FIG. 1 is an external perspective view of an oil-property detection device according to an embodiment of the present invention.
Figure 2:
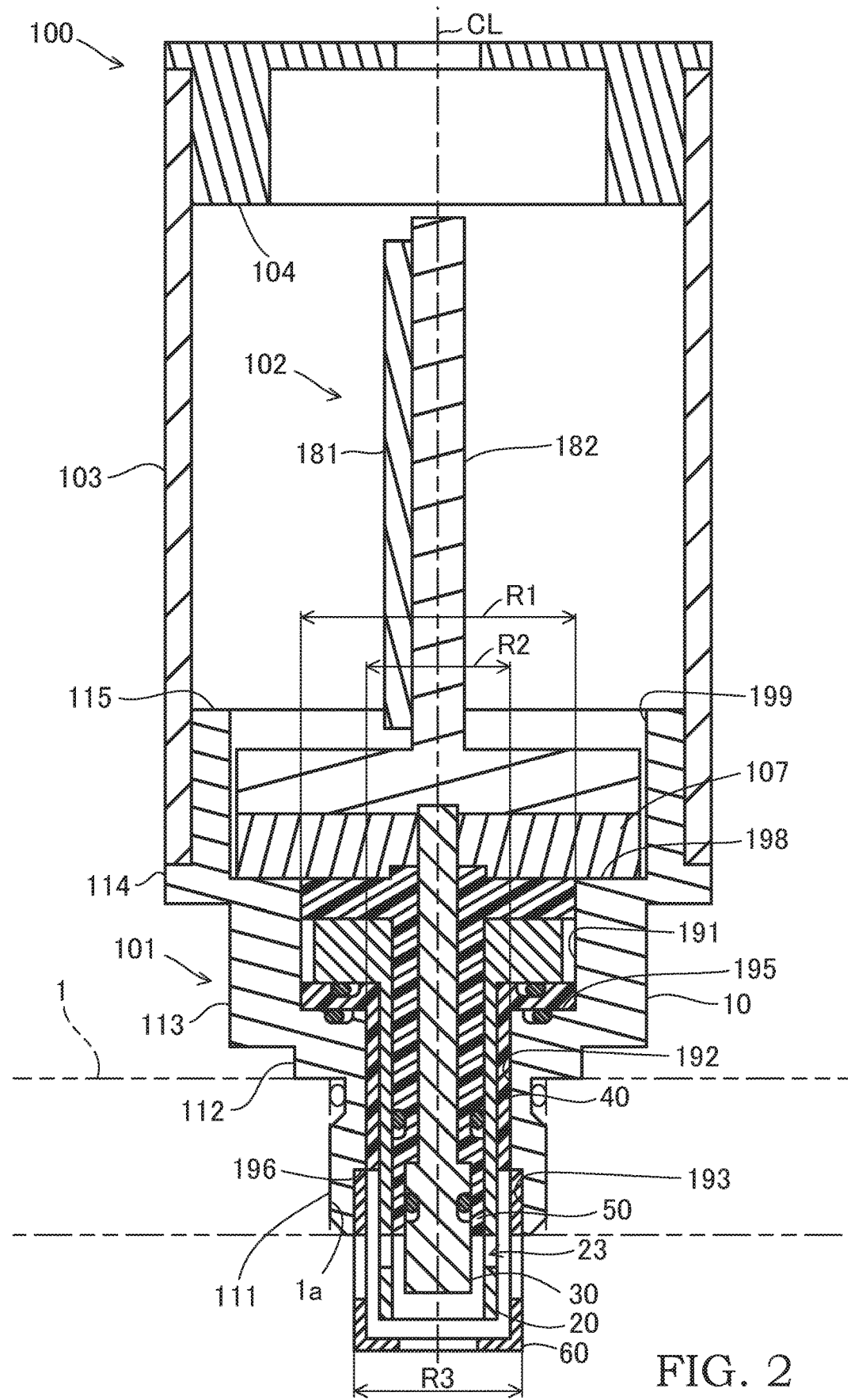
FIG. 2 is a schematic view of a cross-section of the oil-property detection device.

As shown in FIGS. 1 and 2, the oil-property detection device 100 has a detection unit 101, a board unit 102 attached to the detection unit 101, a cylindrical-shaped cylindrical cover 103 that is attached to the detection unit 101 and covers the board unit 102, and an end cover 104 that closes an opening of the cylindrical cover 103.

As shown in FIG. 2, the detection unit 101 is provided with: a tubular outer electrode 20; a bar-shaped inner electrode 30 that is provided inside the outer electrode 20 so as to face the outer electrode 20; a housing 10 that is attached to the piping 1 of the external processing device and holds the outer electrode 20 and the inner electrode 30; an attachment plate 107 serving as an attachment member that is fixed to the housing 10 by screws, etc.; an outer spacer 40 serving as an outer insulating member that is provided between the housing 10 and the outer electrode 20, that insulates between the housing 10 and the outer electrode 20, and that defines a position of the outer electrode 20 with respect to the housing 10; an inner spacer 50 serving as an inner insulating member that is provided between the outer electrode 20 and the inner electrode 30, that insulates between the outer electrode 20 and the inner electrode 30 and insulates between the housing 10 and the inner electrode 30, and that defines a position of the inner electrode 30 with respect to the housing 10; and an electrode cover 60 that is attached to the housing 10 and covers tip end portions of the outer electrode 20 and the inner electrode 30.

In the following, the direction parallel to a center axis CL of the outer electrode 20 is referred to as the axial direction of the oil-property detection device 100, and the direction perpendicular to the axial direction is referred to as the radial direction of the oil-property detection device 100. In addition, the side at which the end cover 104 is arranged is referred to as the base end side of the oil-property detection device 100, and the opposite side in the axial direction is referred to as the tip end side of the oil-property detection device 100.

The oil-property detection device 100 is attached to the piping 1, through the inside of which the working oil flows, by being screw connected, and the electrical properties of the working oil are detected by a detection portion 23 that is arranged inside the piping 1. The detection portion 23 is configured with the tip end portions of the outer electrode 20 and the inner electrode 30. The detection portion 23 protrudes out from the housing 10 so as to be exposed to the working oil contained in the piping 1 of the external processing devices.

The board unit 102 is provided with a circuit board 181 and a board holding member 182 that holds the circuit board 181. The board holding member 182 is fixed to the attachment plate 107 of the detection unit 101 by using screws, etc.

The housing 10 is formed of a conductive metal material, and has an attachment portion 111, a mounting portion 112, a nut portion 113, a cover receiving portion 114, and an inserted portion 115 in this order from the tip end side to the base end side. The attachment portion 111 has a cylindrical shape, and is formed with an external thread on an outer circumference thereof so as to engage with an internal thread formed on an inner circumference of an attachment hole 1a of the piping 1. By inserting and screwing the attachment portion 111 to the attachment hole 1a, the oil-property detection device 100 is attached to the piping 1.

The mounting portion 112 is a disc-shaped portion having an outer diameter larger than that of the attachment portion 111, and a surface on the tip end side thereof is mounted on a circumferential edge portion of an opening of the attachment hole 1a of the piping 1. It should be noted that the configuration is not limited to a case in which the mounting portion 112 is attached directly to the piping 1, however; the mounting portion 112 may be attached to the piping 1 via a cover plate.

The nut portion 113 is formed to have a hexagonal column shape. Therefore, it is possible to attach the attachment portion 111 to the attachment hole 1a with ease by rotating the nut portion 113 by a tool such as a spanner, etc.

The inserted portion 115 has a cylindrical shape and is a portion that is inserted into the inside of the cylindrical cover 103. The cover receiving portion 114 is a flange part that protrudes radially outwards from the base end of the nut portion 113, and a tip end surface of the cylindrical cover 103 is brought into contact with the cover receiving portion 114.

In a state in which the inserted portion 115 is inserted into the cylindrical cover 103 and the tip end surface of the cylindrical cover 103 is brought into contact with the cover receiving portion 114, the cylindrical cover 103 is fixed to the inserted portion 115 by screws, etc.

The end cover 104 is fixed to the cylindrical cover 103 with screws, etc. in a state in which the opening of the cylindrical cover 103 on the base end side is closed by the end cover 104. The board unit 102 is accommodated in an accommodating space defined by the end cover 104, the cylindrical cover 103, and the detection unit 101.

An attachment-plate receiving portion 199 as a space for receiving the attachment plate 107 is provided inside the housing 10. In addition, in the interior of the housing 10, a large-diameter receiving portion 191, a small-diameter receiving portion 192, and a middle-diameter receiving portion 193 are formed on the tip end side of the attachment-plate receiving portion 199 in this order from the base end side to the tip end side as a space for receiving the electrodes and the insulating members.

The large-diameter receiving portion 191, the small-diameter receiving portion 192, and the middle-diameter receiving portion 193 are respectively formed to have circular cross-sections and are formed coaxially. In other words, the large-diameter receiving portion 191, the small-diameter receiving portion 192, and the middle-diameter receiving portion 193 are provided such that their respective center axes coincide with each other. An inner diameter R1 of the large-diameter receiving portion 191, an inner diameter R2 of the small-diameter receiving portion 192, and an inner diameter R3 of the middle-diameter receiving portion 193 are related in terms of their sizes such that R1>R3>R2 is satisfied.

Because the inner diameter R1 of the large-diameter receiving portion 191 is formed so as to be larger than the inner diameter R2 of the small-diameter receiving portion 192, a step portion (a first step portion) 195 is formed between an inner circumferential surface of the large-diameter receiving portion 191 and an inner circumferential surface of the small-diameter receiving portion 192. Because the inner diameter R3 of the middle-diameter receiving portion 193 is formed so as to be larger than the inner diameter R2 of the small-diameter receiving portion 192, a step portion (a second step portion) 196 is formed between an inner circumferential surface of the middle-diameter receiving portion 193 and the inner circumferential surface of the small-diameter receiving portion 192.

Because an inner diameter of the attachment-plate receiving portion 199 is formed so as to be larger than the inner diameter R1 of the large-diameter receiving portion 191, a step portion 198 is formed between an inner circumferential surface of the attachment-plate receiving portion 199 and the inner circumferential surface of the large-diameter receiving portion 191. The attachment plate 107 is fixed to the step portion 198 with screws, etc.

Figure 3:
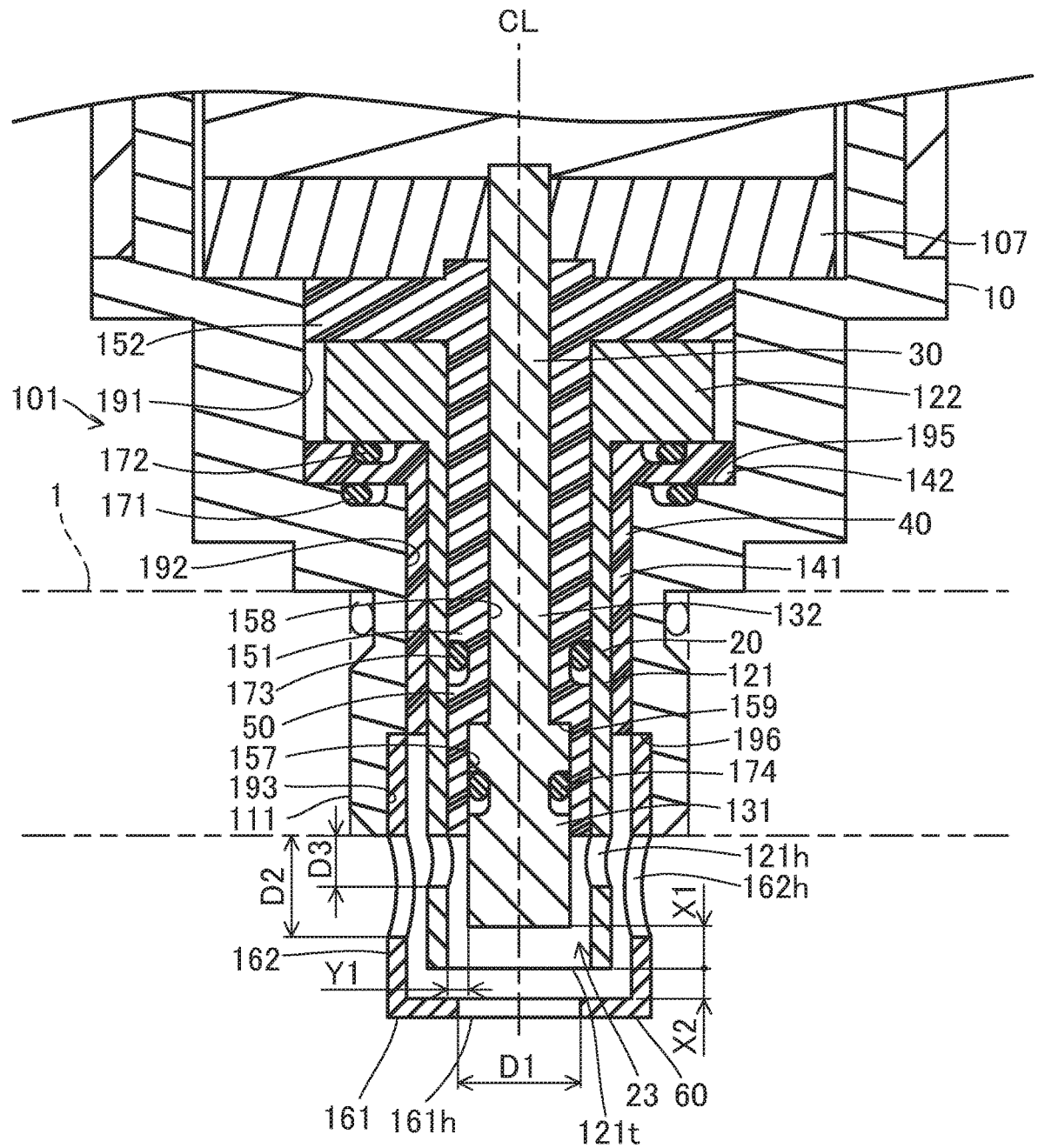
FIG. 3 is a schematic view of a cross-section of a detection unit.

As shown in FIG. 3, the outer electrode 20 is arranged coaxially with the inner electrode 30 so as to cover an outer circumference of the inner electrode 30. A gap through which the working oil can enter is formed between the tip end portion of the inner electrode 30 and the tip end portion of the outer electrode 20 forming the detection portion 23. The outer electrode 20 and the inner electrode 30 are each electrically connected to a detection circuit 185 (see FIG. 4), which is mounted on the circuit board 181, via electric wirings (not shown).

Figure 4:
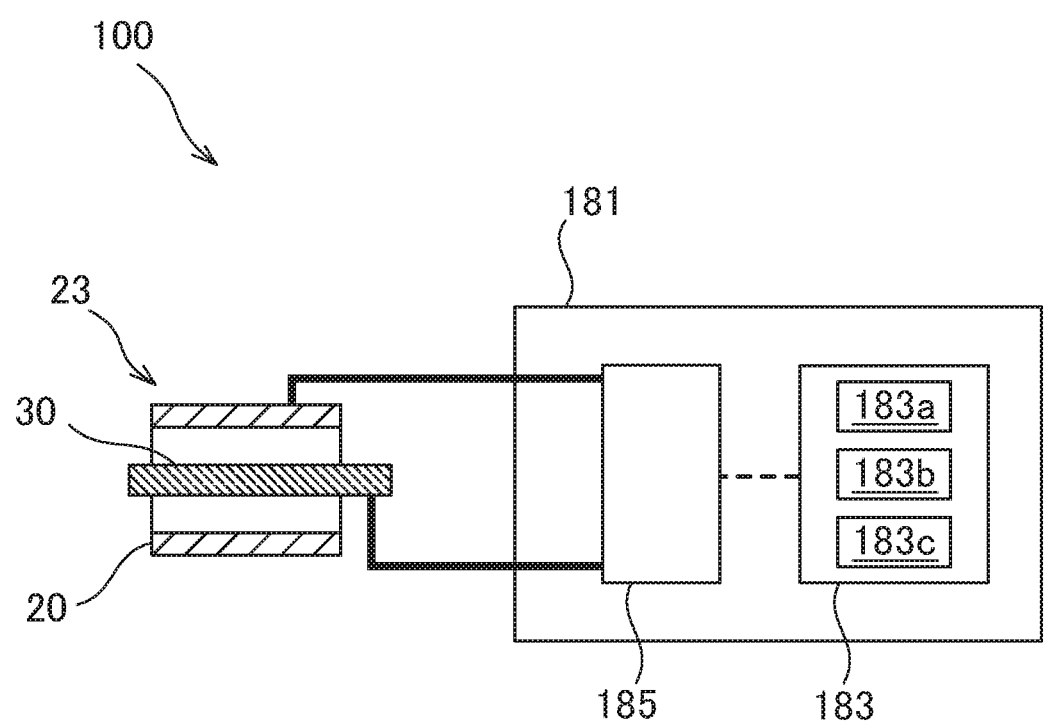
FIG. 4 is a schematic view showing a configuration of the oil-property detection device.

As shown in FIG. 4, the detection circuit 185 detects the voltage value applied between the inner electrode 30 and the outer electrode 20 and the voltage value correlated to the current value between and the inner electrode 30 and the outer electrode 20. The voltage value detected by the detection circuit 185 is output to a control unit 183 mounted on the circuit board 181 as the electrical property of the working oil.

The control unit 183 is a microcomputer, and has: a computing unit 183a that computes the electrical conductivity and relative dielectric constant that are property values of the working oil on the basis of the voltage value that is the electrical property between the tip end portion of the outer electrode 20 and the tip end portion of the inner electrode 30 forming the detection portion 23; a storage unit 183*b* that is capable of storing the electrical conductivity and the relative dielectric constant computed by the computing unit 183*a* and the voltage value detected by the detection portion 23; an auxiliary storage unit 183*c* such as a ROM, a RAM, and so forth that stores a program, etc. used by the computing unit 183*a*; and an input-output interface (not shown). The computing unit 183*a* is a so-called central processing unit (CPU), and the storage unit 183*b* is a nonvolatile memory such as a rewritable EEPROM, etc. The control unit 183 outputs the computed result from the computing unit 183*a* to an external control device (not shown) arranged outside the oil-property detection device 100.

The computing unit 183*a* computes the electrostatic capacitance between the inner electrode 30 and the outer electrode 20 on the basis of the detection result from the detection circuit 185 and computes the relative dielectric constant of the working oil on the basis of the computed electrostatic capacitance. In addition, the computing unit 183*a* computes the resistance value between the inner electrode 30 and the outer electrode 20 on the basis of the detection result from the detection circuit 185 and computes the electrical conductivity of the working oil on the basis of the computed resistance value. As described above, with the oil-property detection device 100, the properties of the working oil in the gap between the inner electrode 30 and the outer electrode 20 are detected.

As shown in FIG. 3, the outer electrode 20 is formed of a conductive metal material and has a cylindrical-shaped outer-electrode tube portion 121 and an outer-electrode flange 122 that protrudes radially outwards from a base end portion of the outer-electrode tube portion 121. The outer spacer 40 is formed of an insulating resin material and has a cylindrical shape outer insulating tube portion 141 and an outer insulating flange 142 that protrudes radially outwards from a base end portion of the outer insulating tube portion 141.

The inner electrode 30 is formed of the conductive metal material and has a circular columnar large-diameter portion 131 that is provided at the tip end and a circular columnar small-diameter portion 132 that extends towards the base end side of the oil-property detection device 100 from the large-diameter portion 131. The outer diameter of the large-diameter portion 131 is larger than the outer diameter of the small-diameter portion 132. The inner spacer 50 is formed of an insulating resin material and has a cylindrical-shaped inner insulating tube portion 151 and an inner insulating flange 152 that protrudes radially outwards from a base end portion of the inner insulating tube portion 151.

In the large-diameter receiving portion 191 serving as a flange receiving opening portion in the housing 10, the outer insulating flange 142, the outer-electrode flange 122, and the inner insulating flange 152 are received in a state in which they are arranged by being stacked in this order from the tip end side to the base end side. The outer insulating flange 142 is stacked such that a surface on the tip end side thereof comes to contact with the step portion 195, and the outer-electrode flange 122 is stacked so as to come to contact with a surface on the base end side (a base end surface) of the outer insulating flange 142. The inner insulating flange 152 is stacked so as to come to contact with a surface on the base end side (a base end surface) of the outer-electrode flange 122, and the attachment plate 107 is stacked so as to come to contact with a surface on the base end side (a base end surface) of the inner insulating flange 152.

The inner insulating flange 152, the outer-electrode flange 122, and the outer insulating flange 142 are sandwiched between the step portion 195 of the housing 10 and the attachment plate 107. Thus, the position of the outer electrode 20 in the axial direction is defined by the outer insulating flange 142 and the inner insulating flange 152.

An outer circumferential surface of the inner insulating flange 152 and an outer circumferential surface of the outer insulating flange 142 are in contact with the inner circumferential surface of the large-diameter receiving portion 191. Thus, the positions of the outer spacer 40 and the inner spacer 50 in the radial direction are defined by the large-diameter receiving portion 191 of the housing 10.

A base end portion of the inner electrode 30 is adhered to the attachment plate 107, and the inner electrode 30 projects out from the attachment portion 111 by extending from the attachment plate 107 through the large-diameter receiving portion 191, the small-diameter receiving portion 192, and the middle-diameter receiving portion 193.

The inner insulating tube portion 151 extends in the axial direction from the inner insulating flange 152 to a tip end surface of the attachment portion 111. A tip end surface of the inner insulating tube portion 151 is formed to be flush with the tip end surface of the attachment portion 111. In other words, the tip end of the inner insulating tube portion 151 does not protrude out from an opening surface of the middle-diameter receiving portion 193 formed in the attachment portion 111.

The outer-electrode tube portion 121 protrudes out from the attachment portion 111 by extending from the outer-electrode flange 122 through the large-diameter receiving portion 191, the small-diameter receiving portion 192, and the middle-diameter receiving portion 193.

The outer insulating tube portion 141 extends in the axial direction from the outer insulating flange 142 to the step portion 196. A tip end surface of the outer insulating tube portion 141 is formed to be flush with the step portion 196. In other words, the tip end of the outer insulating tube portion 141 does not protrude out from an opening surface of the small-diameter receiving portion 192 formed in the step portion 196.

Therefore, when the electrode cover 60 is attached by inserting it into the middle-diameter receiving portion 193, it is possible to prevent the outer spacer 40 from being damaged as the tip end of the outer insulating tube portion 141 is bitten between an end portion of the electrode cover 60 and the step portion 196. Because the biting of the outer insulating tube portion 141 is prevented, it is possible to attach the electrode cover 60 by inserting it into the middle-diameter receiving portion 193 with ease.

In the small-diameter receiving portion 192 serving as a tube-portion receiving opening portion in the housing 10, the inner electrode 30, the inner insulating tube portion 151, the outer-electrode tube portion 121, and the outer insulating tube portion 141 are received in a state in which they are arranged by being stacked radially outwards in this order from the center axis side. The inner insulating tube portion 151 is stacked so as to come to contact with an outer circumferential surface of the inner electrode 30, the outer-electrode tube portion 121 is stacked so as to come to contact with an outer circumferential surface of the inner insulating tube portion 151, and the outer insulating tube portion 141 is stacked so as to come to contact with an outer circumferential surface of the outer-electrode tube portion 121. An outer circumferential surface of the outer insulating tube portion 141 is arranged in a state in which it is in contact with the inner circumferential surface of the small-diameter receiving portion 192.

As described above, the outer insulating tube portion 141 is arranged between the inner circumferential surface of the small-diameter receiving portion 192 of the housing 10 and the outer circumferential surface of the outer-electrode tube portion 121, and the inner insulating tube portion 151 is arranged between an inner circumferential surface of the outer-electrode tube portion 121 and the outer circumferential surface of the inner electrode 30. Thus, the positions of the outer electrode 20 and the inner electrode 30 in the radial direction are defined by the outer insulating tube portion 141 and the inner insulating tube portion 151.

As a space for receiving the inner electrode 30, the inner insulating tube portion 151 has, on the tip end side thereof, the tip end side receiving portion 157 that receives the large-diameter portion 131 of the inner electrode 30 and, on the base end side thereof, the base end side receiving portion 158 that receives the small-diameter portion 132 of the inner electrode 30. Because the inner diameter of the tip end side receiving portion 157 is larger than the inner diameter of the base end side receiving portion 158, a step portion 159 is formed between an inner circumferential surface of the tip end side receiving portion 157 and an inner circumferential surface of the base end side receiving portion 158. A step portion formed between an outer circumferential surface of the large-diameter portion 131 and an outer circumferential surface of the small-diameter portion 132 comes to contact with the step portion 159. Thus, the position of the inner electrode 30 in the axial direction is defined by the inner spacer 50.

The outer spacer 40, the outer electrode 20, the inner spacer 50, and the inner electrode 30 are arranged coaxially, and they are aligned such that their center axes coincide with the center axis of the housing 10. As described above, the positions of the outer electrode 20 and the inner electrode 30 in the radial direction and in the axial direction are defined by, the outer spacer 40 and the inner spacer 50. With such a configuration, it is possible to easily perform a fixing operation of fixing the inner electrode 30 and the outer electrode 20 to the housing 10 with screws, etc. In addition, it is possible to keep the distance between the inner electrode 30 and the outer electrode 20 constant and to maintain the detection accuracy of the oil-property detection device 100.

The outer diameter of the outer-electrode flange 122 is set so as to have a dimension smaller than the inner diameter of the large-diameter receiving portion 191, and thereby, the outer-electrode flange 122 is prevented from coming into contact with the large-diameter receiving portion 191.

If the piping 1 is electrically connected to the outer electrode 20, when there is external noise on the piping 1, there is a problem in that the detection accuracy is deteriorated by the influence of the noise.

The voltage value detected by the oil-property detection device 100 is very small compared with the voltage value of a commercial power supply that supplies electrical power to the electric motor of the external processing device. Therefore, when the noise from the commercial power supply enters the oil-property detection device 100 via the external processing device, the voltage value detected by the oil-property detection device 100 is largely influenced by the noise.

Thus, in this embodiment, as described above, the outer spacer 40 and the inner spacer 50 are used to insulate the housing 10 attached to the piping 1 of the external processing device from the outer electrode 20 and the inner electrode 30. With such a configuration, even when there is the external noise on the external processing device (the noise from the commercial power supply, etc.), it is possible to suppress the influence of the external noise applied to the electrical property detected between the outer electrode 20 and the inner electrode 30. As a result, it is possible to improve the detection accuracy of the oil-property detection device 100.

An outer first seal member (a first seal member) 171 that is an annular O-ring for sealing between the housing 10 and the outer spacer 40 is provided between the step portion 195 and the outer insulating flange 142. Although an example in which the outer first seal member 171 is arranged in an annular groove provided in the step portion 195 is illustrated in the figure, the annular groove for arranging the outer first seal member 171 may be provided in the outer insulating flange 142.

An outer second seal member (a second seal member) 172 that is an annular O-ring for sealing between the outer spacer 40 and the outer electrode 20 is provided between the outer insulating flange 142 and the outer-electrode flange 122. Although an example in which the outer second seal member 172 is arranged in an annular groove provided in the outer insulating flange 142 is illustrated in the figure, the annular groove for arranging the outer second seal member 172 may be provided in the outer-electrode flange 122.

As described above, in this embodiment, the outer first seal member 171 is provided between the step portion 195 and the outer insulating flange 142, and the outer second seal member 172 is provided between the outer insulating flange 142 and the outer-electrode flange 122. With such a configuration, there is no need to provide a space for arranging a seal member in the outer-electrode tube portion 121 and the outer insulating tube portion 141. Thus, the thickness of each of the outer-electrode tube portion 121 and the outer insulating tube portion 141 can be made thin, and so, it is possible to reduce the size of the oil-property detection device 100.

An inner first seal member 174 that is an annular O-ring for sealing between the inner electrode 30 and the inner spacer 50 is provided between the large-diameter portion 131 of the inner electrode 30 and the inner insulating tube portion 151. An inner second seal member 173 that is an annular O-ring for sealing between the inner spacer 50 and the outer electrode 20 is provided between the inner insulating tube portion 151 and the outer-electrode tube portion 121.

The electrode cover 60 is inserted into and attached to the middle-diameter receiving portion 193 serving as a cover-insertion-attachment opening portion provided in the attachment portion 111 by press-fitting. It should be noted that a fixing method is not limited to the press-fitting, and various fixing methods such as crimping process, welding, and so forth can be employed. The electrode cover 60 is a cylindrical member having a bottom, and has a disc-shaped bottom portion 161 and a side portion 162 that is erected upwards from an outer circumference edge of the bottom portion 161.

As the electrode cover 60 is inserted and attached, the tip end portions of the outer electrode 20 and the inner electrode 30 are covered by the electrode cover 60. Therefore, during an operation of attaching the oil-property detection device 100 to the piping 1, direct contact of an outer circumferential surface of the piping 1, a jig, and so forth to the tip end portions of the outer electrode 20 and the inner electrode 30 (the detection portion 23) can be avoided, and thereby, it is possible to prevent the tip end portions of the electrodes (the detection portion 23) from being damaged. Because the tip end portions of the electrodes (the detection portion 23) can be protected with the electrode cover 60, it is possible to provide the oil-property detection device 100 having a high reliability.

The bottom portion 161 is provided with a single circular bottom-portion through hole 161h through which the inside and the outside of the electrode cover 60 are communicated. The side portion 162 is provided with a plurality of circular side-portion through holes 162h serving as cover through holes through which the inside and the outside of the electrode cover 60 are communicated. In this embodiment, four side-portion through holes 162h are provided at intervals of 90 degrees in the circumferential direction of the electrode cover 60. The diameters D3 of the side-portion through holes 162h are smaller than the diameter D1 of the bottom-portion through hole 161h (D3<D1).

A tip end portion of the outer-electrode tube portion 121 is provided with a plurality of circular electrode through holes 121h through which the inside and the outside of the outer-electrode tube portion 121 are communicated. In this embodiment, four electrode through holes 121h are provided at intervals of 90 degrees in the circumferential direction of the outer-electrode tube portion 121. The tip end of the outer-electrode tube portion 121 is formed with a circular tip-end opening portion 121t.

As described above, the electrode cover 60 and the outer electrode 20 are formed with a plurality of opening portions for guiding the working oil to the inside. In this configuration, when a bubble is entrapped in the electrode cover 60 together with the working oil, and the bubble enters between the outer electrode 20 and the inner electrode 30, the detection portion 23 detects the property of the bubble (air), leading to a cause of a detection error. Therefore, in this embodiment, the positions of the opening portions (161h and 162h) of the electrode cover 60 and the opening portions (121h and 121t) of the outer electrode 20 are set such that the bubble can readily be discharged to the outside of the electrode cover 60 even when the bubble (air) has entered the inside of the outer electrode 20.

The tip-end opening portion 121t of the outer-electrode tube portion 121 and the bottom-portion through hole 161h of the electrode cover 60 are arranged so as to face with each other and so as to be positioned on the center axis CL of the outer electrode 20. With such a configuration, in a case in which the oil-property detection device 100 is attached to the piping 1 such that the tip end side thereof faces upwards, it is possible to readily discharge the bubble that has entered the inside of the outer electrode 20 to the outside of the electrode cover 60 through the tip-end opening portion 121t and the bottom-portion through hole 161h.

The electrode through hole 121h of the outer-electrode tube portion 121 and the side-portion through hole 162h of the electrode cover 60 are arranged so as to face with each other and so as to be positioned on a line perpendicular to the center axis CL of the outer electrode 20. In other words, when each of the side-portion through hole 162h and the electrode through hole 121h is orthographically projected to a plane perpendicular to the center axis of the side-portion through hole 162h, a projection plane of the side-portion through hole 162h is overlaid with a projection plane of the electrode through hole 121h.

With such a configuration, in a case in which the oil-property detection device 100 is attached to the piping 1 such that its center axis becomes parallel to the horizontal direction, or in a case in which there is a flow of the working oil in the radial direction of the oil-property detection device 100, it is possible to readily discharge the bubble that has entered the inside of the outer electrode 20 to the outside of the electrode cover 60 through the electrode through holes 121h and the side-portion through holes 162h.

Furthermore, in this embodiment, the opening area of one of the side-portion through holes 162h of the electrode cover 60 is set so as to be equal to or larger than the opening area of one of the electrode through holes 121h that is arranged so as to face the particular side-portion through hole 162h. In other words, the diameters D2 of the side-portion through holes 162h are equal to or larger than the diameters D3 of the electrode through holes 121h (D2 D3).

With such a configuration, it is possible to inhibit the entry of the bubble into the inside of the outer electrode 20 through the side-portion through holes 162h and the electrode through holes 121h. In addition, even when the bubble has entered the inside of the outer electrode 20, it is possible to further improve the effect of discharging the bubble to the outside of the electrode cover 60 through the electrode through holes 121h and the side-portion through holes 162h.

The center axes of the electrode through holes 121h and the center axes of the side-portion through holes 162h are each perpendicular to the center axis CL of the outer electrode 20 and are arranged so as to be deviated in the axial direction of the oil-property detection device 100. In this embodiment, the center axes of the side-portion through holes 162h are arranged so as to be deviated from the center axes of the electrode through holes 121h towards the tip end side by (D2−D3)/2. In other words, opening edges of the electrode through holes 121h on the base end side and opening edges of the side-portion through holes 162h on the base end side are positioned on the line perpendicular to the center axis CL of the outer electrode 20.

Therefore, in a case in which the oil-property detection device 100 is attached to the piping 1 such that the tip end side thereof faces upwards and in a case in which there is the flow in the radial direction of the oil-property detection device 100, it is possible to readily discharge the bubble that has entered the inside of the outer electrode 20 to the outside of the electrode cover 60 through the electrode through holes 121h and the side-portion through holes 162h.

In this embodiment, the plurality of side-portion through holes 162h and the plurality of electrode through holes 121h are each arranged such that the positions of the side-portion through holes 162h and the positions of the electrode through holes 121h coincide in the circumferential direction. More specifically, the respective center axes of the side-portion through hole 162h and the electrode through hole 121h that are arranged so as to face each other are arranged in a plane including the center axis CL of the outer electrode 20. Therefore, when each of the side-portion through hole 162h and the electrode through hole 121h is orthographically projected to the plane perpendicular to the center axis of the side-portion through holes 162h, a whole projection plane of the electrode through hole 121h is included in the projection plane of the side-portion through hole 162h. It should be noted that although it is preferable that the whole projection plane of the electrode through hole 121h be included in the projection plane of the side-portion through holes 162h, arrangement may be made such that at least a part of the projection plane of the electrode through hole 121h is overlaid with the projection plane of the side-portion through hole 162h.

In a case in which the oil-property detection device 100 is attached to the piping 1 such that the tip end side thereof faces downwards, if a gap is formed between the outer electrode 20 and the inner electrode 30 on the base end side of the electrode through holes 121*h*, there is a risk in that it becomes difficult to discharge the bubble. In this embodiment, the inner insulating tube portion 151 extends to the electrode through holes 121*h*, and a gap is not formed between the outer electrode 20 and the inner electrode 30 on the base end side of the electrode through holes 121*h*. Therefore, even in a case in which the oil-property detection device 100 is attached to the piping 1 such that the tip end side thereof faces downwards, it is possible to readily discharge the bubble that has entered the inside of the outer electrode 20 to the outside of the electrode cover 60.

The electrode cover 60 is formed of a conductive material such as ferrous alloy, etc. capable of shielding electromagnetic wave and has a function as an electromagnetic shield that suppresses the influence of external electromagnetic wave to the detection portion 23. With such a configuration, it is possible to suppress the influence of the external electromagnetic wave to the detection portion 23 of the outer electrode 20 and the inner electrode 30. As a result, it is possible to improve the detection accuracy of the oil-property detection device 100.

An axial direction distance X1 between the tip end surface of the inner electrode 30 and the tip end surface of the outer electrode 20 is longer than the shortest distance between the inner electrode 30 and the outer electrode 20, in other words, the axial direction distance X1 is longer than a radial-direction distance Y1 between the outer circumferential surface of the inner electrode 30 and the inner circumferential surface of the outer electrode 20 (X1>Y1). With such a configuration, because electric flux line between the inner electrode 30 and the outer electrode 20 can be increased effectively, it is possible to improve the detection accuracy of the oil-property detection device 100.

An axial direction distance X2 corresponding to the shortest distance between the tip end surface of the inner electrode 30 and a facing surface of the electrode cover 60 (an inner surface of the bottom portion 161) facing the tip end surface of the inner electrode 30 is shorter than the axial direction distance X1 between the tip end surfaces of the electrodes (X2<X1). The axial direction distance X2 is longer than the radial-direction distance Y1 corresponding to the shortest distance between the inner electrode 30 and the outer electrode 20 (X2>Y1).

By setting the axial direction distance X2 between the electrode and the cover to be longer than the radial-direction distance Y1 between the electrodes, it is possible to suppress the influence of the metallic electrode cover 60 to the detection accuracy of the oil-property detection device 100.

According to the above-described embodiment, following operational advantages are afforded.

The oil-property detection device 100 is provided with: the housing 10 that is attached to the piping 1 of the external processing device and that is configured to hold the outer electrode 20 and the inner electrode 30; the outer spacer 40 that is provided between the housing 10 and the outer electrode 20 and that is configured to insulate between the housing 10 and the outer electrode 20; and the inner spacer 50 that is provided between the outer electrode 20 and the inner electrode 30, and that is configured to insulate between the outer electrode 20 and the inner electrode 30 and to insulate between the housing 10 and the inner electrode 30. Because the outer spacer 40 and the inner spacer 50 are used to insulate the housing 10 attached to the piping 1 of the external processing device from the outer electrode 20 and the inner electrode 30, even when there is the external noise on the external processing device (the noise from the commercial power supply, etc.), it is possible to suppress the influence of the external noise applied to the electrical property detected between the outer electrode 20 and the inner electrode 30. As a result, it is possible to improve the detection accuracy of the oil-property detection device 100.

With the oil-property detection device 100 according to this embodiment, regardless of attachment angle with respect to the piping 1 of the external processing device, even in a case in which the bubble has entered the inside of the outer electrode 20, it is possible to readily discharge the bubble to the outside of the electrode cover 60. Because the detection result can be obtained stably by the oil-property detection device 100 regardless of the attachment angle by preventing the bubble from being bitten between the outer electrode 20 and the inner electrode 30, it is possible to provide the oil-property detection device 100 having a high degree of freedom for the attachment angle.

Following modifications are also within the scope of the present invention, and it is also possible to combine the configurations shown in the modification with the configurations described in the above-described embodiment, and to combine the configurations described in the following different modifications.

(First Modification)

In the above-mentioned embodiment, although a description has been given of an example in which the outer first seal member 171 is provided between the step portion 196 and the outer insulating flange 142, the present invention is not limited to this configuration. The outer first seal member 171 may be provided between the small-diameter receiving portion 192 and the outer-electrode tube portion 121.

(Second Modification)

In the above-mentioned embodiment, although a description has been given of an example in which the outer second seal member 172 is provided between the outer insulating flange 142 and the outer-electrode flange 122, the present invention is not limited to this configuration. The outer second seal member 172 may be provided between the outer insulating tube portion 141 and the outer-electrode tube portion 121.

(Third Modification)

In the above-mentioned embodiment, although a description has been given of an example in which the electrode through holes 121*h* and the side-portion through holes 162*h* serving as the cover through hole are positioned on the line perpendicular to the center axis CL of the outer electrode 20, the present invention is not limited to this configuration. The electrode through holes 121*h* and the side-portion through holes 162*h* may be arranged so as to be deviated in the circumferential direction.

(Fourth Modification)

One of the bottom-portion through hole 161*h* and the side-portion through holes 162*h* of the electrode cover 60 may be omitted. In addition, because the tip end of the outer electrode 20 is opened, the electrode through holes 121*h* may be omitted. It suffices that an opening through which the inside and the outside of the electrode cover 60 are communicated and an opening through which the inside and the outside of the outer electrode 20 are communicated are at least provided.

(Fifth Modification)

In the above-mentioned embodiment, although a description has been given of the oil-property detection device 100 provided with the electrode cover 60, the present invention is not limited to this configuration. The present invention may be applied to the oil-property detection device 100 without the electrode cover 60.

(Sixth Modification)

In the above-mentioned embodiment, although a description has been given of an example in which the electrode cover 60 is formed of a conductive member so as to function as the electromagnetic shield capable of shielding the electromagnetic wave, the present invention is not limited to this configuration. The electrode cover 60 may be formed of a resin material.

(Seventh Modification)

In the above-mentioned embodiment, although a description has been given of an example in which the axial direction distance X2 corresponding to the shortest distance between the tip end surface of the inner electrode 30 and the facing surface of the electrode cover 60 facing the tip end surface of the inner electrode 30 is longer than the radial-direction distance Y1 corresponding to the shortest distance between the inner electrode 30 and the outer electrode 20, the present invention is not limited to this configuration. In the case in which the electrode cover 60 is formed of the resin material, the axial direction distance X2 may be shorter than the radial-direction distance Y1. The axial direction distance X2 may be set as zero by bringing the tip end of the outer electrode 20 into contact with the bottom portion 161 of the electrode cover 60.

(Eighth Modification)

In the above-mentioned embodiment, although a description has been given of an example in which the axial direction distance X1 between the tip end surface of the inner electrode 30 and the tip end surface of the outer electrode 20 is longer than the radial-direction distance Y1 between the outer circumferential surface of the inner electrode 30 and the inner circumferential surface of the outer electrode 20, the present invention is not limited to this configuration. The outer electrode 20 and the inner electrode 30 may be arranged such that the tip end surface of the inner electrode 30 and the tip end surface of the outer electrode 20 become flush with each other.

(Ninth Modification)

The shapes of the outer electrode 20, the inner electrode 30, the outer spacer 40, and the inner spacer 50 are not limited to those in the above-mentioned embodiment, and various shapes can be employed. For example, although a description has been given of an example in which the inner electrode 30 is provided with the large-diameter portion 131 and the small-diameter portion 132 having the circular columnar shape, the inner electrode 30 may have a configuration in which the large-diameter portion 131 and the small-diameter portion 132 having the cylindrical shape are provided.

The configurations, operations, and effects of the embodiments of the present invention will be collectively described below.

The oil-property detection device 100 is the fluid-property detection device for detecting the property of the working oil (the detection target fluid) contained in the external device, the oil-property detection device 100 including: the tubular the outer electrode 20; the bar-shaped inner electrode 30 provided inside the outer electrode 20; the computing unit 183a configured to compute the property value of the working oil based on the electrical property between the outer electrode 20 and the inner electrode 30; the housing 10 attached to the external device, the housing 10 being configured to hold the outer electrode 20 and the inner electrode 30; the outer spacer (the outer insulating member) 40 provided between the housing 10 and the outer electrode 20, the outer spacer 40 being configured to insulate between the housing 10 and the outer electrode 20 and being configured to define the position of the outer electrode 20 with respect to the housing 10; and the inner spacer (the inner insulating member) 50 provided between the outer electrode 20 and the inner electrode 30, the inner spacer 50 being configured to insulate between the outer electrode 20 and the inner electrode 30, being configured to insulate between the housing 10 and the inner electrode 30, and being configured to define the position of the inner electrode 30 with respect to the housing 10, wherein the outer electrode 20 and the inner electrode 30 respectively have the tip end portions, the tip end portions projecting out from the housing 10 and being exposed to the working oil contained in the external device.

With this configuration, the housing 10 that is attached to the external device is insulated from the outer electrode 20 and the inner electrode 30 by the outer spacer 40 and the inner spacer 50. With such a configuration, even when there is the external noise on the external device (the noise from the commercial power supply, etc.), it is possible to suppress the influence of the external noise applied to the electrical property detected between the outer electrode 20 and the inner electrode 30. As a result, it is possible to improve the detection accuracy of the oil-property detection device 100.

The oil-property detection device 100 further includes the electrode cover 60 attached to the housing 10, the electrode cover 60 being configured to cover the tip end portions of the outer electrode 20 and the inner electrode 30.

With this configuration, because the tip end portions of the outer electrode 20 and the inner electrode 30 can be protected by the electrode cover 60, it is possible to provide the oil-property detection device 100 with a high reliability.

In the oil-property detection device 100, the outer electrode 20 is provided with the electrode through hole 121h through which the inside and the outside of the outer electrode 20 are communicated, the electrode cover 60 is provided with the side-portion through hole 162h serving as the cover through hole through which the inside and the outside of the electrode cover 60 are communicated, and the electrode through hole 121h and the side-portion through hole 162h are positioned on the line perpendicular to the center axis CL of the outer electrode 20.

In the oil-property detection device 100, the opening area of the side-portion through hole 162h is set so as to be equal to or larger than the opening area of the electrode through hole 121h.

With these configurations, it is possible to readily discharge the bubble between the outer electrode 20 and the inner electrode 30 through the electrode through hole 121h and the side-portion through hole 162h to the outside of the electrode cover 60.

In the oil-property detection device 100, the electrode cover 60 is the electromagnetic shield capable of shielding the electromagnetic wave, and the shortest distance between the tip end surface of the inner electrode 30 and the facing surface of the electrode cover 60 facing the tip end surface of the inner electrode 30 is longer than the shortest distance between the inner electrode 30 and the outer electrode 20.

With this configuration, it is possible to suppress the influence of the external electromagnetic wave to the outer electrode 20 and the inner electrode 30 by the electrode cover 60, and further, it is possible to suppress the influence of the electrode cover 60 to the detection accuracy of the oil-property detection device 100.

In the oil-property detection device 100, the axial direction distance X2 between the tip end surface of the inner electrode 30 and the tip end surface of the outer electrode 20 is longer than the radial-direction distance Y1 between the outer circumferential surface of the inner electrode 30 and the inner circumferential surface of the outer electrode 20.

With this configuration, it is possible to increase the electric flux line formed between the inner electrode 30 and the outer electrode 20.

In the oil-property detection device 100, the outer electrode 20 has: the cylindrical-shaped outer-electrode tube portion 121; and the outer-electrode flange 122 configured to project radially outwards from the base end portion of the outer-electrode tube portion 121, the outer spacer 40 has: the cylindrical-shaped outer insulating tube portion 141; and the outer insulating flange 142 configured to project radially outwards from the base end portion of the outer insulating tube portion 141, the inner spacer 50 has: the cylindrical-shaped inner insulating tube portion 151; and the inner insulating flange 152 configured to project radially outwards from the base end portion of the inner insulating tube portion 151, the housing 10 has: the small-diameter receiving portion (the tube-portion receiving opening portion) 192 configured to receive the inner insulating tube portion 151 in contact with the outer circumferential surface of the inner electrode 30, the outer-electrode tube portion 121 in contact with the outer circumferential surface of the inner insulating tube portion 151, and the outer insulating tube portion 141 in contact with the outer circumferential surface of the outer-electrode tube portion 121, the small-diameter receiving portion 192 being in contact with the outer circumferential surface of the outer insulating tube portion 141; the large-diameter receiving portion (the flange receiving opening portion) 191 configured to receive the outer insulating flange 142, the outer-electrode flange 122 in contact with the base end surface of the outer insulating flange 142, and the inner insulating flange 152 in contact with the base end surface of the outer-electrode flange 122; and the step portion (the first step portion) 195 provided between the small-diameter receiving portion 192 and the large-diameter receiving portion 191, the step portion 195 being in contact with a tip end surface of the outer insulating flange 142, and the oil-property detection device 100 further including the attachment plate (attachment member) 107 in contact with the base end surface of the inner insulating flange 152.

With this configuration, the inner electrode 30 and the outer electrode 20 are aligned in the radial direction with respect to the housing 10 by the outer insulating tube portion 141 and the inner insulating tube portion 151, and the outer electrode 20 is aligned in the axial direction with respect to the housing 10 by the outer insulating flange 142 and the inner insulating flange 152.

The oil-property detection device 100 further includes: the outer first seal member (the first seal member) 171 provided between the step portion 195 and the outer insulating flange 142, the outer first seal member 171 being configured to seal between the housing 10 and the outer spacer 40; and the outer second seal member (the second seal member) 172 provided between the outer insulating flange 142 and the outer-electrode flange 122, the outer second seal member 172 being configured to seal between the outer spacer 40 and the outer electrode 20.

With this configuration, because there is no need to provide a space for arranging the seal member in the outer-electrode tube portion 121 and the outer insulating tube portion 141, the thickness of each of the outer-electrode tube portion 121 and the outer insulating tube portion 141 can be made thin, and so, it is possible to reduce the size of the oil-property detection device 100.

In the oil-property detection device 100, the housing 10 has the attachment portion 111 inserted into the attachment hole 1a in the external device, the attachment portion 111 is provided with the middle-diameter receiving portion (the cover-insertion-attachment opening portion) 193 so as to be in coaxial with the small-diameter receiving portion 192, the middle-diameter receiving portion 193 having the inner diameter larger than the inner diameter the small-diameter receiving portion 192, the electrode cover 60 is attached by being inserted into the middle-diameter receiving portion 193, and the tip end of the outer insulating tube portion 141 is configured so as not to project out from the opening surface of the small-diameter receiving portion 192 formed in the step portion (the second step portion) 196 between the middle-diameter receiving portion 193 and the small-diameter receiving portion 192.

With this configuration, it is possible to attach the electrode cover 60 by inserting it into the middle-diameter receiving portion 193 of the housing 10 without damaging the outer spacer 40.

Embodiments of this invention were described above, but the above embodiments are merely examples of applications of this invention, and the technical scope of this invention is not limited to the specific constitutions of the above embodiments.

This application claims priority based on Japanese Patent Application No. 2017-174361 filed with the Japan Patent Office on Sep. 11, 2017, the entire contents of which are incorporated into this specification.

The invention claimed is:

1. A fluid-property detection device for detecting a property of a detection target fluid contained in an external device, the fluid-property detection device comprising:
  a tubular outer electrode;
  a bar-shaped inner electrode provided inside the outer electrode;
  a computing unit configured to compute a property value of the detection target fluid based on an electrical property between the outer electrode and the inner electrode;
  a housing attached to the external device, the housing being configured to hold the outer electrode and the inner electrode;
  an outer insulating member provided between the housing and the outer electrode, the outer insulating member being configured to insulate between the housing and the outer electrode and being configured to define a position of the outer electrode with respect to the housing;
  an inner insulating member provided between the outer electrode and the inner electrode, the inner insulating member being configured to insulate between the outer electrode and the inner electrode, being configured to insulate between the housing and the inner electrode, and being configured to define a position of the inner electrode with respect to the housing; and
  an electrode cover attached to the housing, the electrode cover being configured to cover tip end portions of the outer electrode and the inner electrode, wherein
  the outer electrode and the inner electrode respectively have the tip end portions, the tip end portions projecting out from the housing and being configured to be exposed to the detection target fluid contained in the external device,
  the outer electrode is provided with an electrode through hole through which an inside and an outside of the outer electrode communicate with each other, the electrode cover is provided with a cover through hole through which an inside and an outside of the electrode cover communicate with each other, and the electrode through hole and the cover through hole are positioned on a line perpendicular to a center axis of the outer electrode.

2. The fluid-property detection device according to claim 1, wherein an opening area of the cover through hole is set so as to be equal to or larger than an opening area of the electrode through hole.

3. The fluid-property detection device according to claim 1, wherein the electrode cover is an electromagnetic shield capable of shielding electromagnetic wave, and a shortest distance between a tip end surface of the inner electrode and a facing surface of the electrode cover facing the tip end surface of the inner electrode is longer than a shortest distance between the inner electrode and the outer electrode.

4. The fluid-property detection device according to claim 1, wherein an axial direction distance between the tip end surface of the inner electrode and a tip end surface of the outer electrode is longer than a radial direction distance between an outer circumferential surface of the inner electrode and an inner circumferential surface of the outer electrode.

5. A fluid-property detection device for detecting a property of a detection target fluid contained in an external device, the fluid-property detection device comprising:

a tubular outer electrode;

a bar-shaped inner electrode provided inside the outer electrode;

a computing unit configured to compute a property value of the detection target fluid based on an electrical property between the outer electrode and the inner electrode;

a housing attached to the external device, the housing being configured to hold the outer electrode and the inner electrode;

an outer insulating member provided between the housing and the outer electrode, the outer insulating member being configured to insulate between the housing and the outer electrode and being configured to define a position of the outer electrode with respect to the housing; and an inner insulating member provided between the outer electrode and the inner electrode, the inner insulating member being configured to insulate between the outer electrode and the inner electrode, being configured to insulate between the housing and the inner electrode, and being configured to define a position of the inner electrode with respect to the housing, wherein the outer electrode and the inner electrode respectively have tip end portions, the tip end portions projecting out from the housing and being configured to be exposed to the detection target fluid contained in the external device, the outer electrode has:

a cylindrically-shaped outer-electrode tube portion; and an outer-electrode flange configured to protrude radially outwards from a base end portion of the outer-electrode tube portion, the outer insulating member has:

a cylindrically-shaped outer insulating tube portion; and an outer insulating flange configured to protrude radially outwards from a base end portion of the outer insulating tube portion, the inner insulating member has:

a cylindrically-shaped inner insulating tube portion; and an inner insulating flange configured to protrude radially outwards from a base end portion of the inner insulating tube portion, the housing has:

a tube-portion receiving opening portion configured to receive the inner insulating tube portion in contact with the outer circumferential surface of the inner electrode, the outer-electrode tube portion in contact with an outer circumferential surface of the inner insulating tube portion, and the outer insulating tube portion in contact with an outer circumferential surface of the outer-electrode tube portion, the tube-portion receiving opening portion being in contact with an outer circumferential surface of the outer insulating tube portion;

a flange receiving opening portion configured to receive the outer insulating flange, the outer-electrode flange in contact with a base end surface of the outer insulating flange, and the inner insulating flange in contact with a base end surface of the outer-electrode flange; and a first step portion provided between the tube-portion receiving opening portion and the flange receiving opening portion, the first step portion being in contact with a tip end surface of the outer insulating flange, and the fluid-property detection device further comprising an attachment member in contact with a base end surface of the inner insulating flange.

6. The fluid-property detection device according to claim 5, further comprising:

a first seal member provided between the first step portion and the outer insulating flange, the first seal member being configured to seal between the housing and the outer insulating member; and a second seal member provided between the outer insulating flange and the outer-electrode flange, the second seal member being configured to seal between the outer insulating member and the outer electrode.

7. The fluid-property detection device according to claim 5, wherein the housing has an attachment portion inserted into an attachment hole in the external device, the attachment portion is provided with a cover-insertion-attachment opening portion so as to be in coaxial with the tube-portion receiving opening portion, the cover-insertion-attachment opening portion having an inner diameter larger than an inner diameter of the tube-portion receiving opening portion, the electrode cover is attached by being inserted into the cover-insertion-attachment opening portion, and a tip end of the outer insulating tube portion is configured so as not to project out from an opening surface of the tube-portion receiving opening portion formed in a second step portion between the cover-insertion-attachment opening portion and the tube-portion receiving opening portion.

* * * * *